Patented Mar. 24, 1942

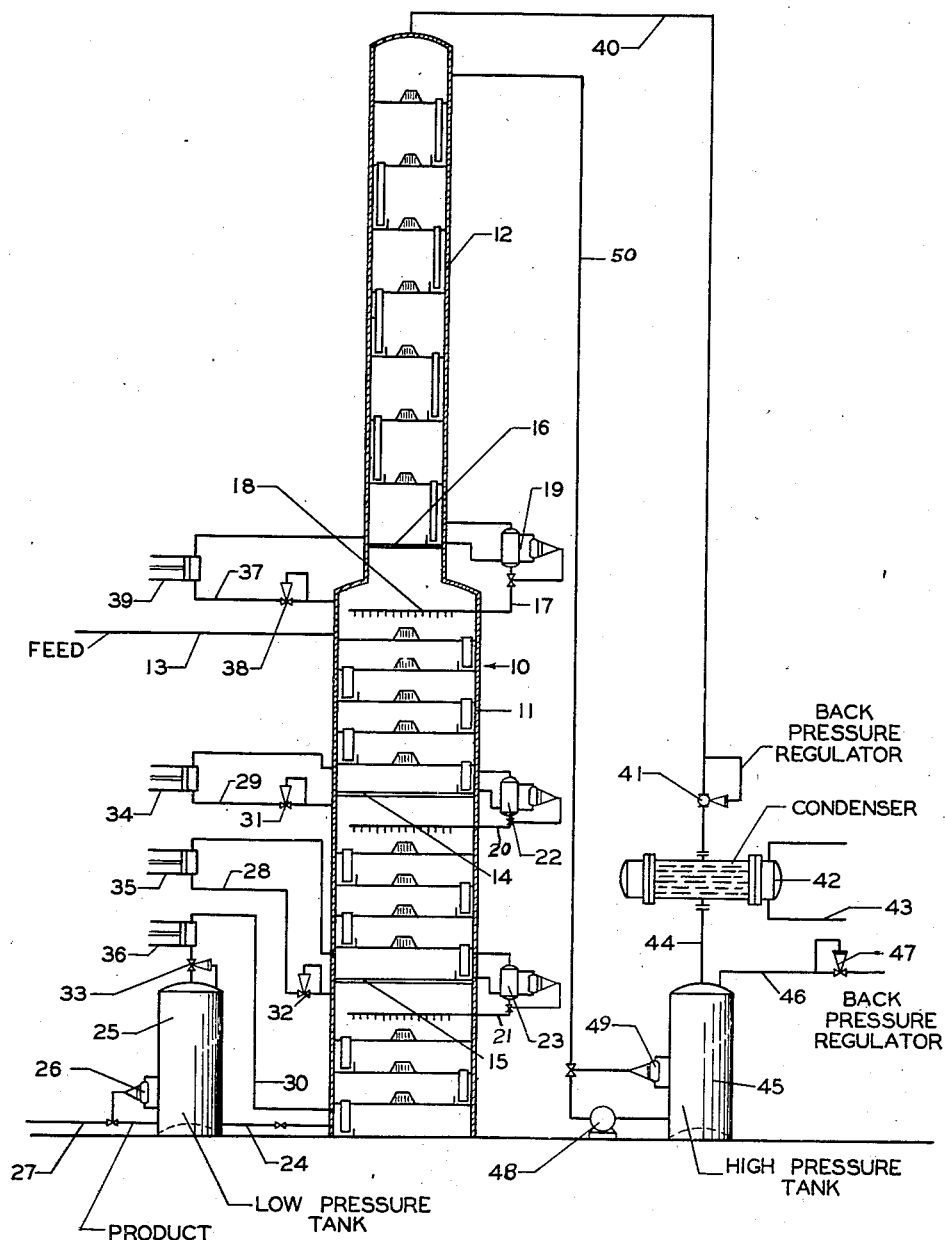

2,277,387

UNITED STATES PATENT OFFICE 2,277,387

METHOD FOR SEPARATING VAPORS AND LIQUIDS

Samuel C. Carney, Bartlesville, Okla., assignor to Phillips Petroleum Company, a corporation of Delaware Application March 31, 1939, Serial No. 265,357

6 Claims. (Cl. 196—11)

The present invention relates to a method for separating gases, vapors and liquids.

More specifically the invention relates to a method of rectification for the separation of dissolved gases and volatile vapors from a solution containing the same.

In industry there are many occasions where undesirable dissolved components in a solution must be removed. This is the case in the alcohol, petroleum, and other industries. In the petroleum industry, for example, the removal of hydrogen, methane, hydrogen sulfide, and other gases from crude oil and its products is a constantly recurring problem. Further, the manufacture of natural gasoline and polymerization feedstock necessitates rectification of the raw product into commercial fractions with particular reference to the removal from the raw product of methane. The present invention is particularly suited to the removal of methane alone or methane and ethane both but may be applied also for the removal of propane and even butane altho it is not as efficient in the separation of butane as known processes. The present method and apparatus are herein described specifically as applied to the rectification of raw natural gasoline as a specific example to facilitate clear understanding thereof but it will be clear that the invention is as readily applicable to other problems as mentioned above.

The conventional rectifying column used for stabilizing natural gasoline has a substantially constant pressure throughout its length with a temperature higher at the bottom than at the top. In other words the feedstock charged to the column is subjected to a stripping action by raising its temperature as it flows down the column and the stripped vapors have their temperature lowered as they flow up the column. Thus the equilibrium conditions existing throughout the column vary due to temperature change. The applicant's invention on the other hand causes the equilibrium conditions throughout the column to vary due to pressure change.

The advantages of this procedure are manifold. The phenomena involving evolution of dissolved vapors from solutions wherein the dissolved vapors are of varying degrees of volatility or molecular weight results in the components moving into the vapor phase in different relative proportions depending on whether temperature or pressure is varied. The present invention sets up conditions under which the light components are moved into the vapor phase in proportions relatively larger than the components which it is desired to retain in the solution. On the other hand prior practice by relying on change of temperature to drive the undesirable components from solution, opposed natural law and so had the problem of bucking the tendency of the heavier desirable components to escape from solution.

An important object of the present invention is the provision of a method for rectification in which a pressure gradient replaces the usual temperature gradient.

An additional important object of the present invention is the provision of an improved method for separating undesirable gaseous components from liquid containing the same in solution.

A further important object of the present invention is the provision of an improved method for separating natural gasoline raw product into commercial fractions with particular reference to removal from the same of methane, ethane, and propane.

Referring to the drawing, the figure is a schematic view of the apparatus of the invention.

In the figure, reference numeral 10 designates generally a fractionating column having a lower section 11 and an upper section 12. Lower section 11 constitutes a stripping column, and upper section 12 a rectifying column. A feed line 13 for conveying the product to be treated to the apparatus is connected into the upper end of the stripping section 11. Stripping section 11 is divided by imperforate plates 14 and 15 into three isolated stages and rectifying section 12 is separated from stripping section 11 by imperforate plate 16. The lowermost plate of rectifying section 12 is connected by a pipe 17 to a liquid spray device 18 located in the upper end of the top stage of stripping section 11. Interposed in pipe 17 is a liquid level control 19 actuated by the liquid level on the bottom plate of rectifying section 12. The upper two stages of the stripping section are similarly connected by pipes 20 and 21 and liquid level controls 22 and 23. The lowermost stage of stripping section 11 has its lower end connected by pipe 24 to a low pressure accumulation tank 25 in which the liquid level is controlled by liquid level controller 26 connected with a product withdrawal pipe 27. The upper end of each of the stages in the stripping section is connected for vapor flow to the lower end of the next stage by pipes 28 and 29. The upper end of accumulation tank 25 is connected for vapor flow with the lower end of the bottom stage of the stripping section 11 by pipe 30. Pipes 28, 29 and 30 have interposed therein back pressure regulators 31, 32 and 33 respectively, and vapor compressors 34, 35 and 36 respectively. The upper end of the uppermost stage of the stripping section 11 is connected for vapor flow by pipe 37 to the lower end of rectifying section 12. A back pressure regulator 38 and vapor compressor 39 are interposed in pipe 37. Rectifying section 12 and the stages of stripping section 11 contain the conventional bubble plates or any other desirable medium for causing prolonged and thorough contact between rising vapors and descending liquids. The upper end of rectifying section 12 is connected by pipe 40 having back pressure regulator 41 interposed therein to condenser 42 having pipe connections 43 for admitting and withdrawing a cooling medium. Vapors condensed in condenser 42 are withdrawn through pipe 44 to a high pressure accumulation tank 45. Vapors evolved in accumulation tank 45 are withdrawn through pipe 46 having back pressure regulator 47 interposed therein. Liquid is withdrawn from accumulation tank 45 by pump 48 in amount controlled by liquid level control 49 and passed by pipe 50 to the top plate of rectifying section 12 as a reflux.

During operation, the back pressure regulators 31, 32, 33, 38, 41 and 47 maintain constant pressures in the various sections and tanks with which they are associated.

In operation, the pressures maintained in the stages of stripping section 11 increase in value from the lowermost to the uppermost, and the pressure in rectifying section 12 is higher than that in the uppermost stage in stripping section 11. The value of the pressure at each of these points depends upon the product being treated and in the case of raw natural gasoline the lowermost stage can be 25 pounds per square inch, the next stage 50 pounds per square inch, the uppermost stage 80 pounds per square inch and that of the rectifying section 180 pounds per square inch. It will be understood that these pressures will vary depending upon the composition of the material being treated and the degree of separation desired. The value of pressure in the present instance chosen for the uppermost stage of the stripping section 11 might be conveniently about the same as the vapor pressure of the feedstock to avoid a heavy pumping load in charging the feed to the column. As the liquid charged to the column flows downwardly through the stages of the stripping section, vapors are evolved having an increasing proportion of heavier components due to the reduction in pressure. However, these vapors evolved are passed by the compressors to the next higher stage where they are intimately contacted with the descending stream of liquid with the result that the heavier components are again dissolved which in turn forces lighter components still remaining in the descending liquid into the vapor phase.

In the present embodiment a number of mols of vapor evolved from the finished product in the low pressure accumulator tank 25 of suitable relation to the number of mols of feed are injected into the base of the column. This amount may be calculated so as to remove completely, or any desired fraction of the propane, from the material leaving the base of the 25 pound stage, and the 25 pound pressure may be adjusted up or down to fit the desired final temperature of the product. Vapor so introduced will either strip propane or it will go into solution and by so doing evaporate an equal volume of some lighter vapor. The introduction of a constant vapor volume is the equivalent of a constant heat input and since it is a qualitative and not a quantitative function, an amount to strip propane of one concentration will also suffice to strip it at any other concentration at any rate of flow of feed.

The equimolar flow of vapor up a column, even in this one where the dependent variable, pressure, is given prominence over the usual one, temperature, is one of the basic concepts of rectification. If 100 mols of vapor are introduced and 20 or 80 dissolve, another 20 or another 80 are vaporized by heat of solution. So substantially the same volume but of lighter composition will appear above the top plate of the lower 25# section and will be compressed by compressor 35 and delivered to the 50# section. The liquid flowing down to the top plate will partly evaporate yielding more vapor, but again to the extent that vapor flashes from this reflux liquid, it removes heat thus condensing an equivalent volume. The liquid flow from above to the top plate of each section is pressure condensed reflux but with pressure and composition so arranged that no low temperatures leading to formation of hydrates result. In each column section there exists a temperature gradient as in any other column and operating by the same rules. The average composition in each stage becomes lighter but exists in equilibrium at substantially the same temperature and at a higher pressure.

In the rectifying section the liquid phase is no longer diluted by the incoming feed and the action in the section is the same in principle as in a conventional rectifying column.

The escaping tendency of volatile components dissolved in a multi-component solution is best shown by a comparison of the equilibrium constants, commonly called K's, which are the ratios of the mols of a component in the vapor phase to the mols of that component in the liquid phase, under various conditions of temperature and pressure. It will be obvious that when it is the purpose to separate a component from a liquid mixture including the same, the most desirable conditions are those which cause the component to move into the vapor phase in proportions relatively larger than of those components which it is desirable to retain in the liquid phase.

The following K's were found empirically for the first five paraffins at the conditions set out:

*Table I*

| At 200# | 60° F. | 100° F. | 200° F. | Increase |
|---|---|---|---|---|
| | | | | Percent |
| Methane | 17 | 18.6 | 21 | 23.5 |
| Ethane | 2.4 | 3.1 | 5.6 | 133 |
| Propane | .6 | .95 | 2.3 | 234 |
| Butane | .195 | .345 | 1.0 | 413 |
| Pentane | .057 | .113 | 0.4 | 600 |

It will be noted that with an increase of temperature from 60 to 200° F. at the conventional operating pressure of 200 pounds for the purpose of driving off propane, the increase in escaping tendency of butane is nearly twice as great and of pentane nearly three times as great.

*Table II*

| At 80# | 60° F. | 100° F. | 200° F. | Increase |
|---|---|---|---|---|
| | | | | Percent |
| Methane | 43 | 47 | 53 | 23 |
| Ethane | 5.3 | 7.4 | 13.8 | 162 |
| Propane | 1.38 | 2.23 | 5.4 | 291 |
| Butane | .44 | .8 | 2.35 | 435 |
| Pentane | .125 | .25 | .92 | 636 |

The above table shows that the relatively greater sensitivity to increase temperature of butane and pentane remains essentially the same at the lower pressure of 80 pounds.

In contrast Table III below shows the K's at 60° F. for a range of decreasing pressures.

*Table III*

| At 60° F. | 200# | 80# | 50# | 20# | Increase |
|---|---|---|---|---|---|
| | | | | | *Percent* |
| Methane | 17 | 43 | 68 | 170 | 900 |
| Ethane | 2.4 | 5.3 | 8.4 | 21 | 775 |
| Propane | .6 | 1.38 | 2.13 | 5.3 | 783 |
| Butane | .195 | .44 | .69 | 1.65 | 750 |
| Pentane | .057 | .125 | .19 | .46 | 707 |

This last table shows the escaping tendency of the lighter members increases most rapidly with decrease of pressure. It is to take advantage of this physical law that the present invention was evolved.

Besides following the physical law instead of opposing it as is done in conventional practice, the present invention by lowering the pressure on the raw material while being treated results in a cooling action due to the evaporation so induced which in the case of the natural gasoline amounts to about 20° F. on the bottom product. There is thus provided a substantial part of the necessary reflux and the total reflux required is reduced to a small part of that required by conventional operation, both due to the above factor and by reason of the greater rate efficiency at the lower pressures. High pressure is used in the rectifying section which in principle is identical with the top of a conventional column. Because of the most favorable conditions in the low pressure stripping sections, total flow of vapor upward is very much smaller than in conventional columns. It is true of the present invention also that the mass velocity of vapor is substantially equal throughout its length. The high pressure section may for this reason be half the diameter of a conventional column for the same duty. In both the conventional column and that of the present invention, vapor flow upward is determined by bottom conditions but in the present invention the column diameter of the bottom section is determined by the liquid flow downward rather than by vapor flow upward.

For simplicity and to bring out the point that known principles of rectification govern the present process, the apparatus is shown as one continuous column. In principle, however, there is no difference if each column section be separated and set on its own base preserving the same flow of materials.

I claim:

1. A method of separating dissolved gases and volatile vapors from liquid feedstock containing hydrocarbons boiling within the boiling point range of gasoline comprising passing the feedstock into a first liquid-gas contact zone, passing the liquid effluent of the first contact zone through a plurality of liquid-gas contact zones of decreasing pressures the pressure of the final contact zone being greater than one atmosphere, passing the vaporous effluent of each contact zone to the next higher pressure contact zone, passing the vaporous effluent of the first contact zone to a higher pressure zone to rectify the same and passing liquid effluent of the rectifying step to the first contact zone.

2. A method as described in claim 1 wherein the pressure in the first zone is in the neighborhood of the vapor pressure of feedstock entering this zone.

3. A method as described in claim 1 wherein the liquid effluent of the final contact zone is passed to a lower pressure zone to evolve vapors, and controlling the composition of the liquid effluent of the final zone by passing a controlled amount of the evolved vapors to the final contact zone.

4. A method of separating methane, ethane, and propane from raw natural gasoline comprising feeding the raw natural gasoline into a first liquid-gas contact zone maintained at a pressure in the neighborhood of the vapor pressure of the raw natural gasoline, passing liquid effluent of the first contact zone through a plurality of liquid-gas contact zones of decreasing pressures the pressure of the final zone being greater than atmospheric pressure, passing the vaporous effluent of each contact zone to the next higher pressure contact zone, passing vaporous effluent of the first contact zone to a higher pressure zone to rectify the same, passing liquid effluent of the rectifying step to the first contact zone, passing the liquid effluent of the final contact zone to a lower pressure zone to evolve vapors therefrom, and passing a controlled amount of the evolved vapors to the final contact zone as stripping medium to eliminate a desired fraction of the propane from the liquid effluent of the final contact zone.

5. A method as described in claim 1 wherein the temperature of the liquid effluent of the final contact zone is lower than the temperature of the solution entering the first contact zone.

6. A method as described in claim 1 wherein each succeeding contact zone has a pressure more than one atmosphere lower than the preceding contact zone.

SAMUEL C. CARNEY.